Figure 1:
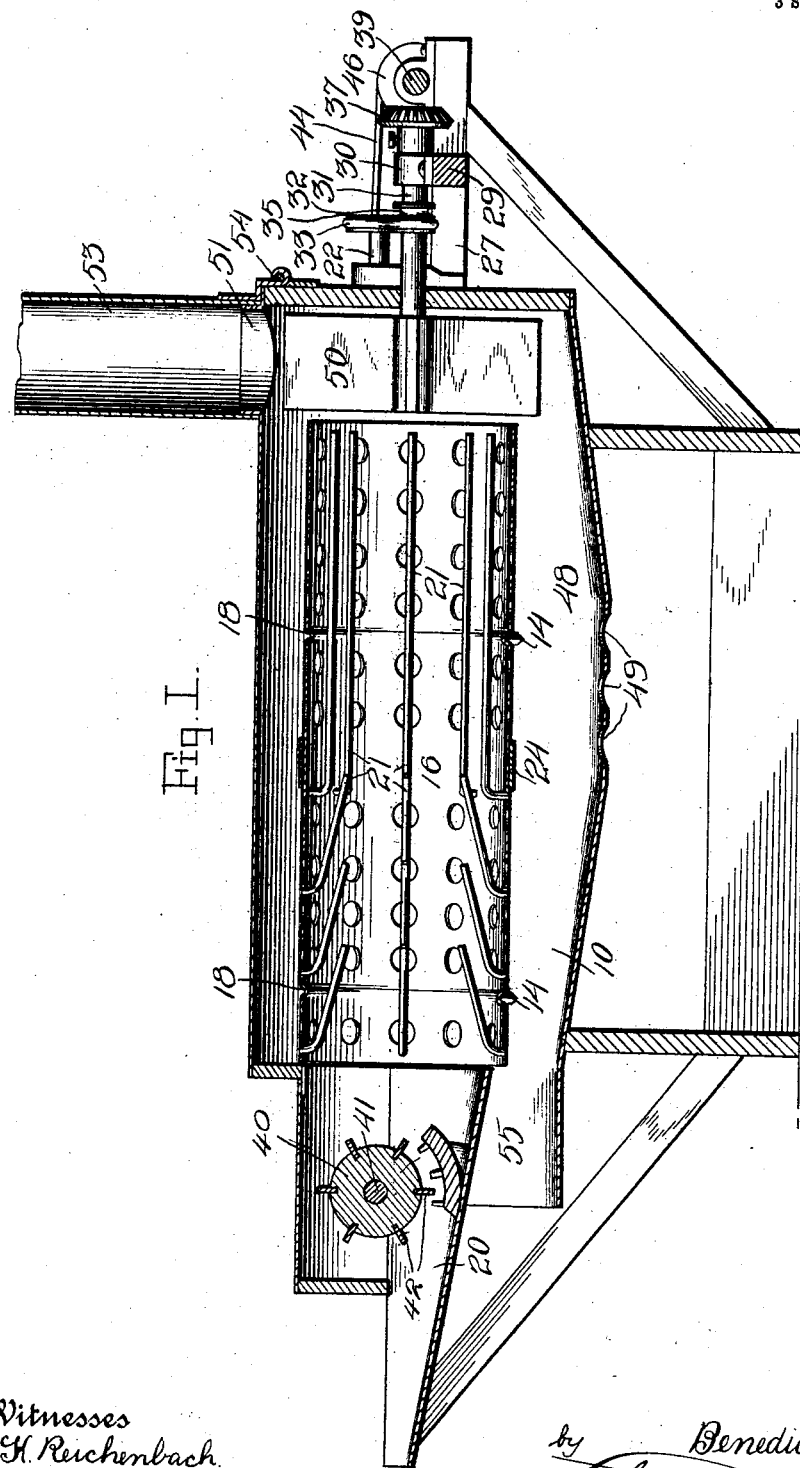

No. 771,368. PATENTED OCT. 4, 1904.
B. JAKOB.
GRAIN SEPARATOR.
APPLICATION FILED MAR. 12, 1904.
NO MODEL. 3 SHEETS—SHEET 2.
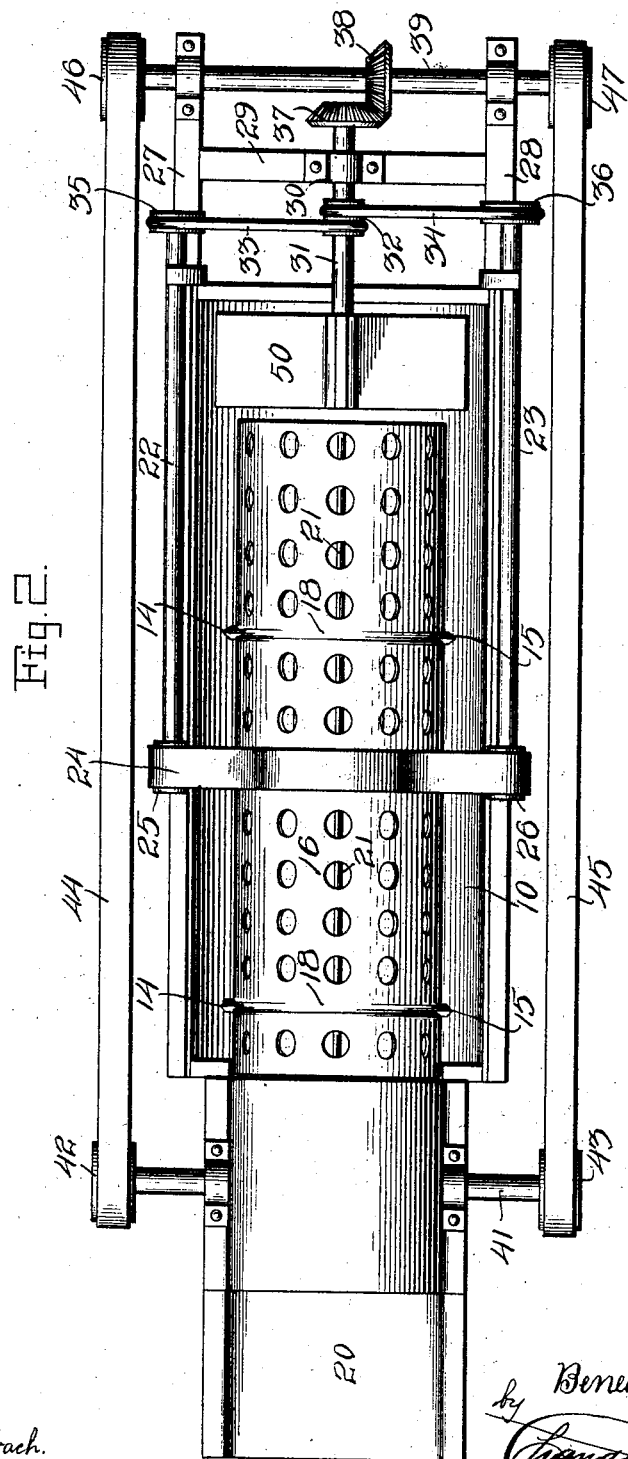
Fig. 2.
Witnesses
E. K. Reichenbach.
J. C. Jones
Inventor
Benedict Jakob
by
Attorneys No. 771,368. PATENTED OCT. 4, 1904.
B. JAKOB.
GRAIN SEPARATOR.
APPLICATION FILED MAR. 12, 1904.
NO MODEL. 3 SHEETS—SHEET 3.
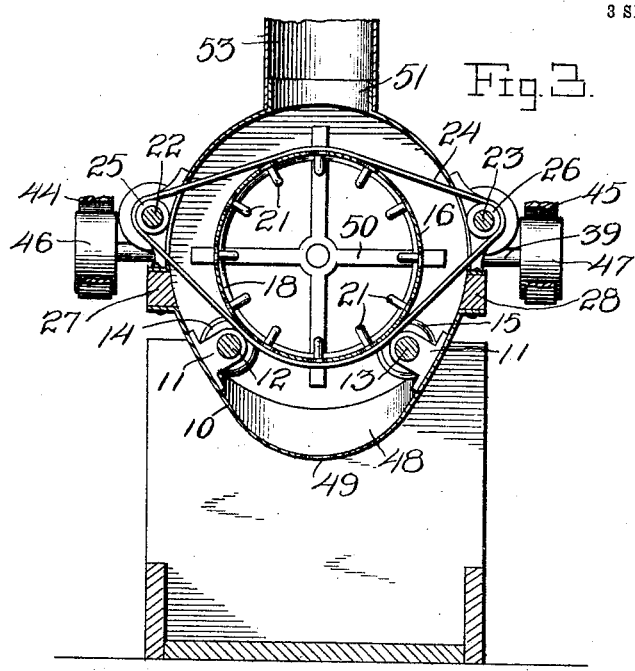
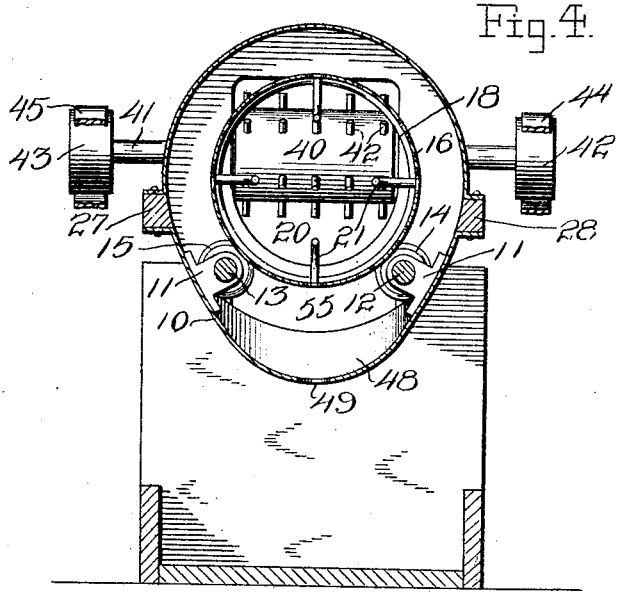
Witnesses
E. K. Reichenbach.
J. C. Jones
Inventor
Benedict Jakob.
by Chandlee & Chandlee
Attorneys No. 771,368.                                                                                        Patented October 4, 1904.

UNITED STATES PATENT OFFICE.

BENEDICT JAKOB, OF STONEYHILL, MISSOURI.

GRAIN-SEPARATOR.

SPECIFICATION forming part of Letters Patent No. 771,368, dated October 4, 1904.

Application filed March 12, 1904. Serial No. 197,859. (No model.)

*To all whom it may concern:*

Be it known that I, BENEDICT JAKOB, a citizen of the United States, residing at Stoneyhill, in the county of Gasconade, State of Missouri, have invented certain new and useful Improvements in Grain-Separators; and I do hereby declare the following to be a full, clear, and exact description of the invention, such as will enable others skilled in the art to which it appertains to make and use the same.

This invention relates to grain-separators such as are used in connection with threshing-machines, the object of the invention being to provide an improved structure in which the grain will be completely separated from the straw and delivered at the bottom of the mechanism, while the straw and chaff will be blown from the mechanism through a stacking-tube.

Other objects and advantages of the invention will be understood from the following description.

In the drawings forming a portion of this specification, and in which like numerals of reference indicate similar parts in the several views, Figure 1 is a vertical section taken longitudinally through the apparatus. Fig. 2 is a top plan view of the apparatus, the top of the casing being removed. Fig. 3 is a transverse section through the apparatus, the driving-belt that directly engages the cylinder being shown in elevation. Fig. 4 is a transverse section through the separating-cylinder, the feeder being in elevation.

Referring now to the drawings, there is shown a grain-separating mechanism comprising a main casing including a lower portion 10, having ears 11, provided with bearings in which are journaled the end portions of shafts 12 and 13, which extend longitudinally of the opposite sides of the casing and which are provided with wheels 14 and 15, respectively, upon which the perforated separating-cylinder 16 rests, said cylinder having circumscribing grooves 18, formed by depressing the cylinder, and in which grooves the wheels engage, so as to hold the cylinder against longitudinal movement in the casing. At one end of the casing is a chute 20, which in practice is disposed to receive at its outer end the material directly from the concave of the thresher, said concave being not shown. The perforated separating-cylinder is horizontally disposed, as illustrated, and the chute is depressed at its inner end and disposed to discharge upon its inner end into the separating-cylinder. To support the straw out of direct contact with the separating-cylinder, fingers 21 are provided, one end of each of which is engaged through the wall of the cylinder, said fingers being bent to extend in the direction of the discharge end of the cylinder and to diverge from the wall of the latter. At the front end of the cylinder these fingers are arranged in longitudinal series, and at the rear end of the cylinder they are arranged in a single series spaced circumferentially of the cylinder. To separate the grain, the separating-cylinder is rotated, and for this purpose two shafts 22 and 23 are journaled in suitable bearings longitudinally of the apparatus exterior to and at opposite sides of the casing and parallel with the axis of the separating-cylinder. Through the sides of the casing are formed openings for passage of an endless belt 24, which passes around pulleys 25 and 26 on the shafts 22 and 23, respectively, and around the central portion of the separating-cylinder, with which latter it is in frictional engagement, so that when the shafts are properly rotated the separating-cylinder will be rotated. From the end of the casing project the sills 27 and 28, having a cross-bar 29 or beam on which is mounted a bearing 30, in which is journaled a shaft 31, which is journaled also in the end of the casing. On the shaft 31 is a belt-pulley 32, with which are engaged belts 33 and 34, which engage also with belt-pulleys 35 and 36, mounted on the shafts 22 and 23, respectively, so that when the shaft 30 is rotated the shafts 22 and 23 are correspondingly moved to rotate the separating-cylinder. The shaft 30 is provided with a bevel-gear 37, which meshes with the bevel-gear 38 on a transverse shaft 39, mounted in bearings at the ends of the sills 27 and 28, and which is the drive-shaft for operating the several parts of the separator.

In order to feed the straw down the chute and into the separating-cylinder, a feeding-cylinder 40 is provided and is carried by a shaft 41, journaled transversely of the chute, said cylinder having fingers 42, which engage and positively urge the straw down the chute and into the separating-cylinder. To rotate the shaft 41, it is provided with a belt-pulley 42 and 43 at its ends, with which are engaged belts 44 and 45, respectively, which engage also belt-pulleys 46 and 47, respectively, upon the shaft 39. As the feeder and separating-cylinder are operated the separated grain passes between the rods 21 to the wall of the separating-cylinder and thence through the perforations of the cylinder to the bottom of the casing, the bottom of the casing beneath the cylinder being depressed to form a runway 48, the lowest portion of which is at the center and is provided with discharge-openings 49, through which the grain may pass into suitable receptacles or into suitable measuring devices and thence to the receptacle. The free ends of the fingers 21 being directed toward the rear of the cylinder, the straw passes freely in that direction through the cylinder and out at the rear end thereof. The casing of the apparatus into which the rear end of the separating-cylinder delivers is itself cylindrical, and the separating-cylinder fits closely and rotatably therein, and in this end of the casing, beyond the end of the separating-cylinder, is arranged a suction fan-wheel 50, said fan-wheel being carried by the shaft 31, which, as illustrated, is passed inwardly through the end of the casing. A collar 51 is secured to the casing directly above the fan-wheel and communicates with the casing and is adapted for engagement by a stacker pipe or tube 53, which is hinged to the casing, as illustrated, for movement into and out of engagement with the collar. A suitable fastening 54 is provided for holding the stacking pipe or tube upon the collar.

The front end of the casing below the feeding-chute is open, as shown at 55, so that air may be readily drawn into the casing and up through the separating-cylinder and thence forced upwardly through the stacking-tube, thus preventing anything but the separated grain from passing through the separating-cylinder and to the runway at the bottom of the casing.

In practice modifications of the specific construction shown may be made and any suitable materials and proportions may be used for the various parts without departing from the spirit of the invention.

It will be understood that with the arrangement of straw-supporting fingers 21 shown the straw is yieldably supported and a positive feed of the straw through the cylinder is permitted.

What is claimed is—

1. A grain-separator comprising a rotatable perforated cylinder, straw-supporting fingers within the inlet end of the cylinder converging toward the axis of the cylinder, and additional straw-supporting fingers in the rear of the convergent fingers and extending parallel with the axis of the cylinder and the outlet end thereof.

2. A grain-separator comprising a rotatable perforated cylinder, straw-supporting fingers within the inlet end of the cylinder converging toward the axis of the cylinder, and additional straw-supporting fingers in the rear of the convergent fingers and extending parallel with the axis of the cylinder and the outlet end thereof, the last-named fingers alternating with the first-named fingers circumferentially of the cylinder.

3. A grain-separator comprising a rotatable perforated cylinder, straw-supporting fingers within the inlet end of the cylinder converging toward the axis of the cylinder, and additional straw-supporting fingers in the rear of the convergent fingers and extending parallel with the axis of the cylinder and the outlet end thereof, the last-named fingers alternating with the first-named fingers circumferentially of the cylinder, a casing for the cylinder, a suction-fan at the discharge end of the cylinder, a stacker-pipe leading from the fan, a main drive-shaft arranged transversely of the separator, a shaft for the fan connected with the main drive-shaft for rotation therefrom, and connections between the fan-shaft and the cylinder for rotating the latter.

In testimony whereof I affix my signature in presence of two witnesses.

BENEDICT JAKOB.

Witnesses:
   JOHN GURLOP, Jr.,
   A. E. MAUPEN.